Figure 1:
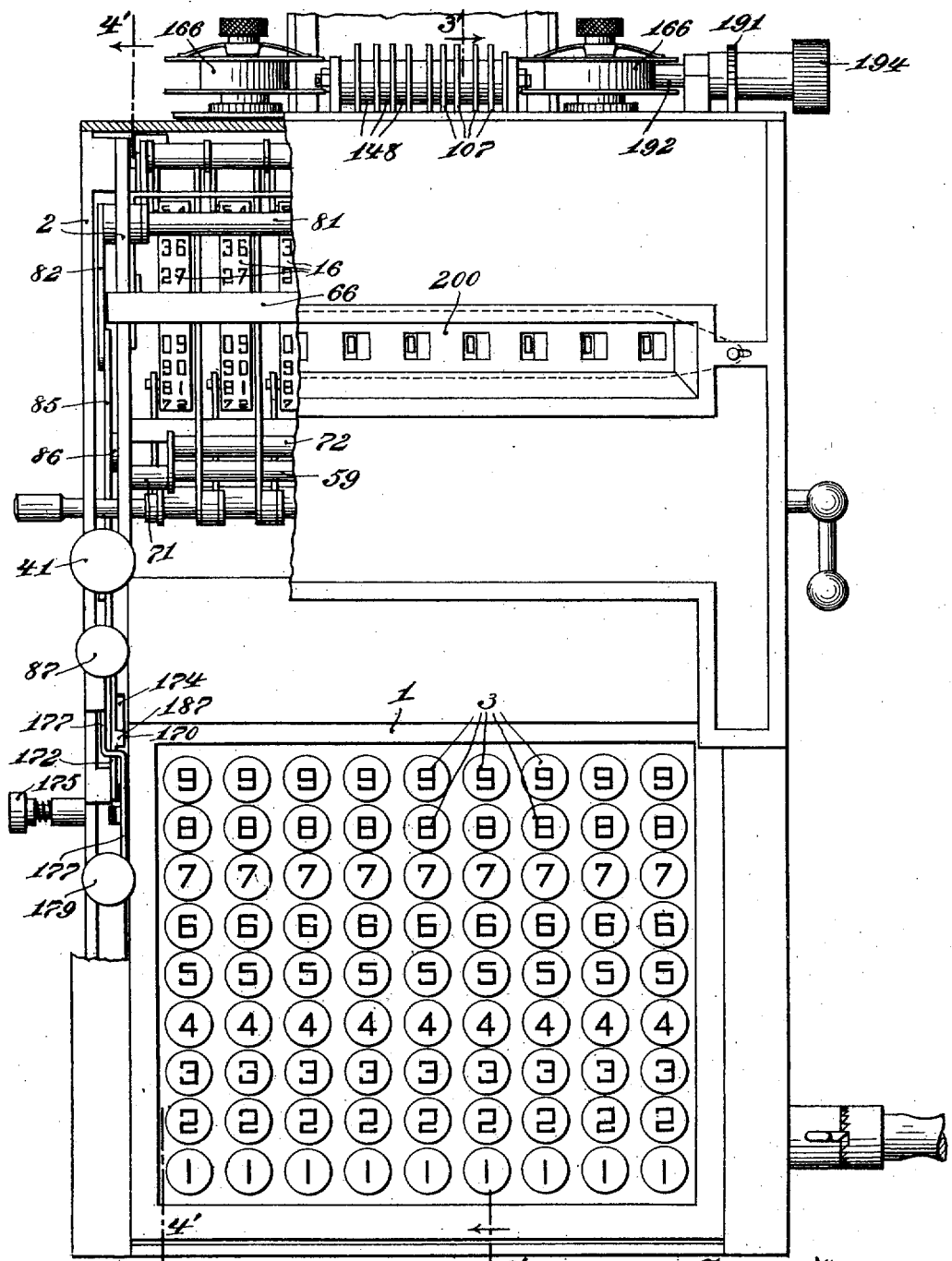

O. E. CLOUD & A. W. ALBERS.
CALCULATING MACHINE.
APPLICATION FILED JUNE 13, 1906.
976,152.
Patented Nov. 22, 1910.
11 SHEETS—SHEET 2.
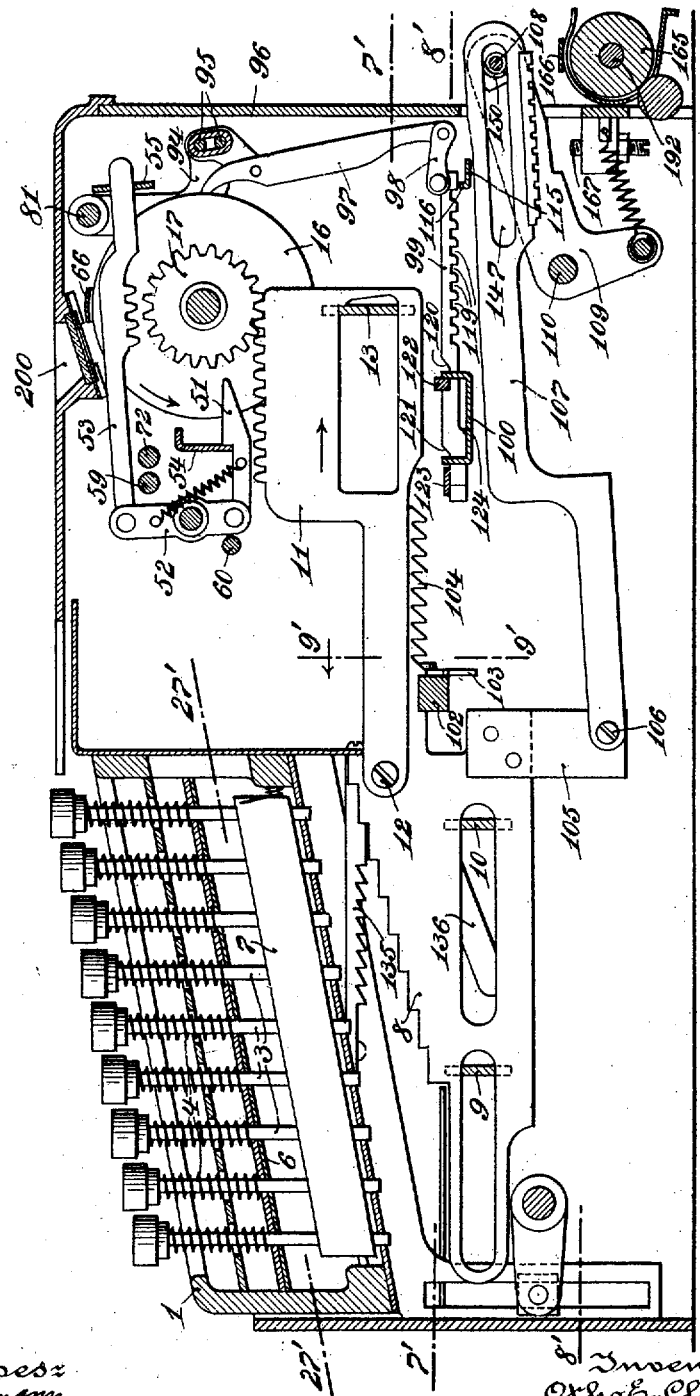

O. E. CLOUD & A. W. ALBERS.
CALCULATING MACHINE.
APPLICATION FILED JUNE 13, 1906.
976,152.
Patented Nov. 22, 1910.
11 SHEETS—SHEET 3.
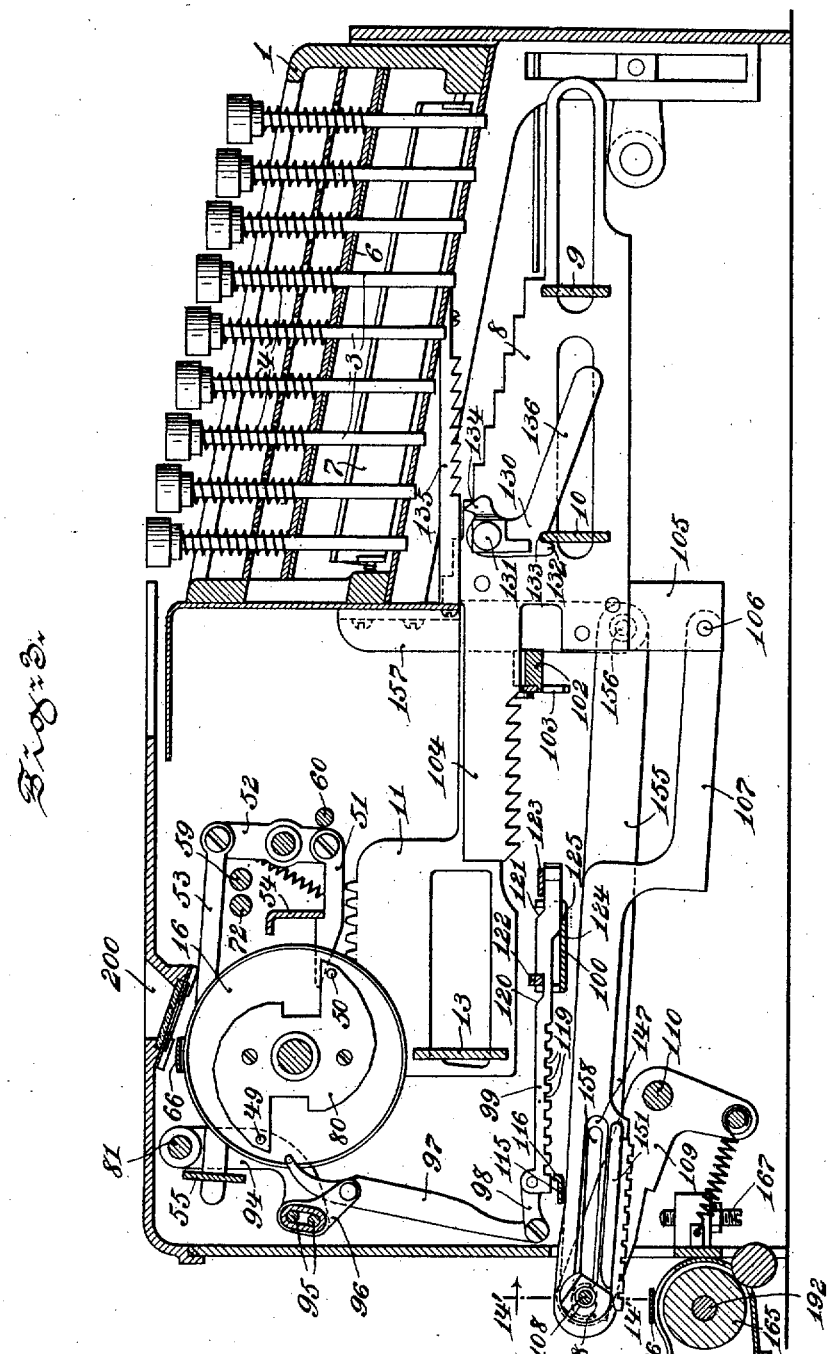

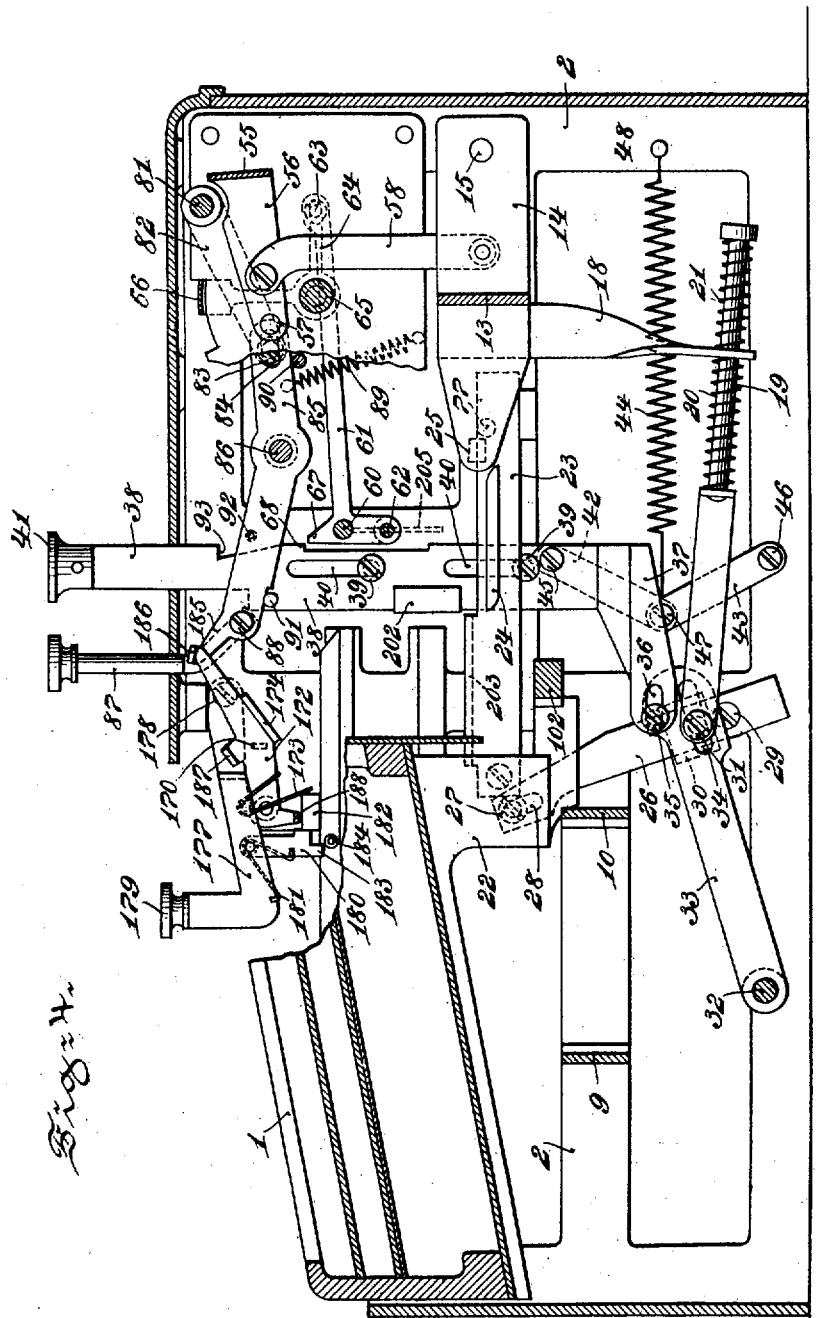

O. E. CLOUD & A. W. ALBERS.
CALCULATING MACHINE.
APPLICATION FILED JUNE 13, 1906.
976,152.
Patented Nov. 22, 1910.
11 SHEETS—SHEET 5.
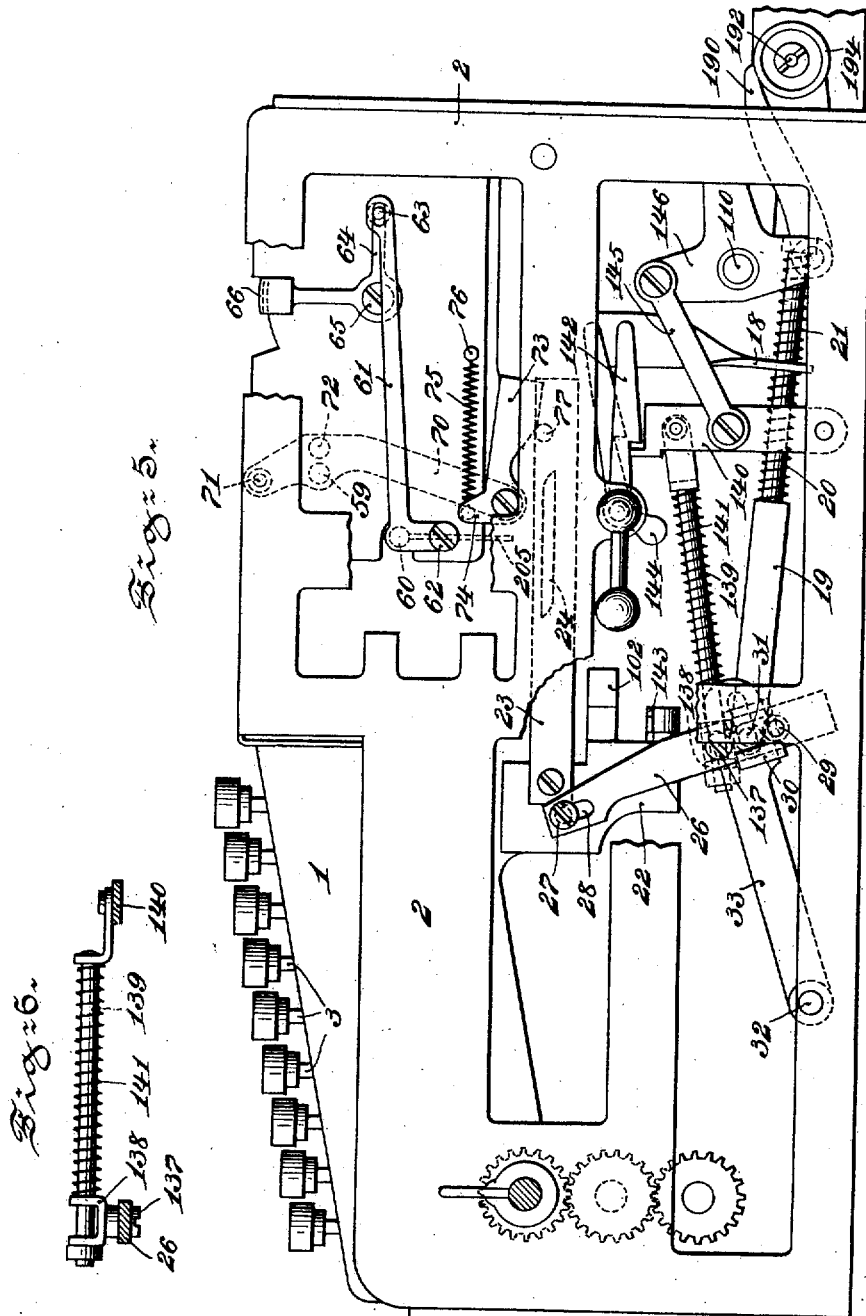

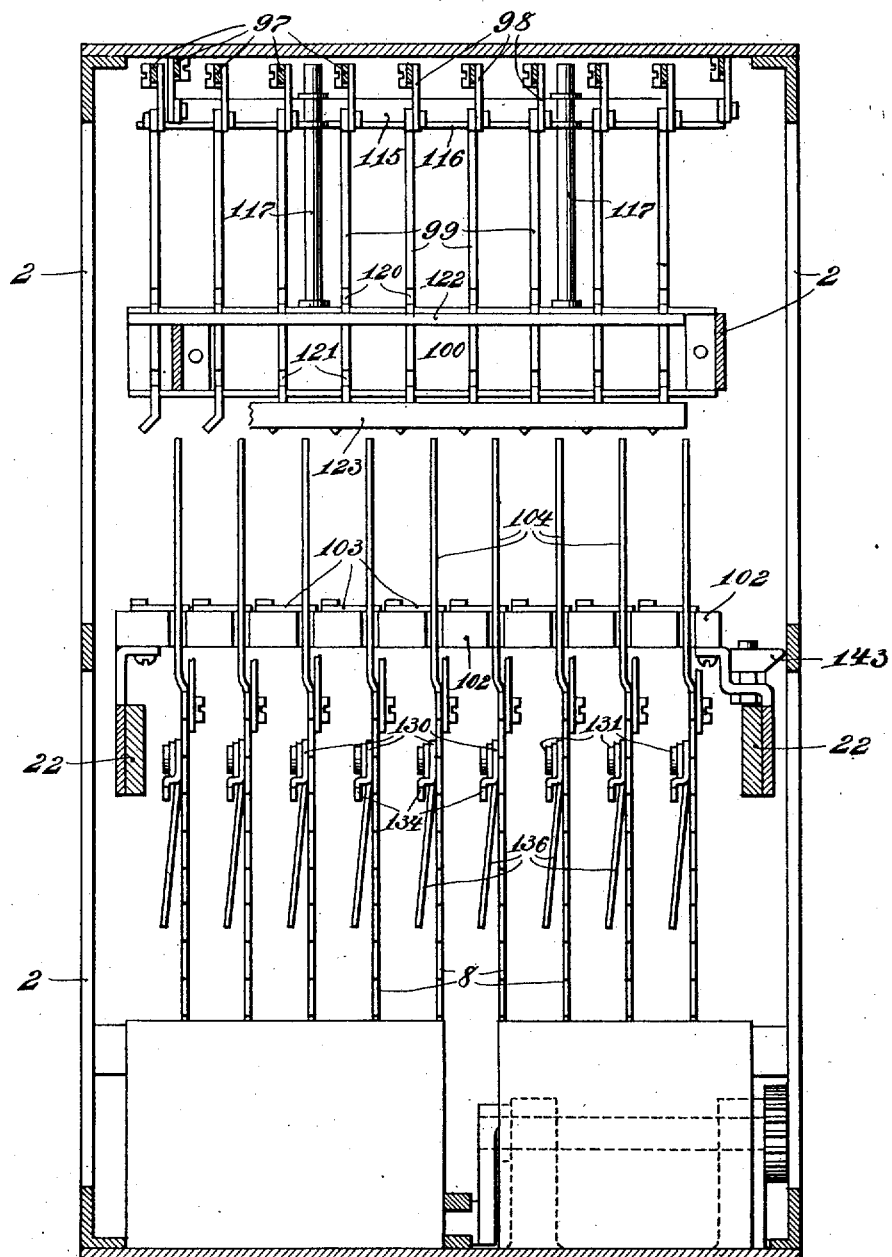

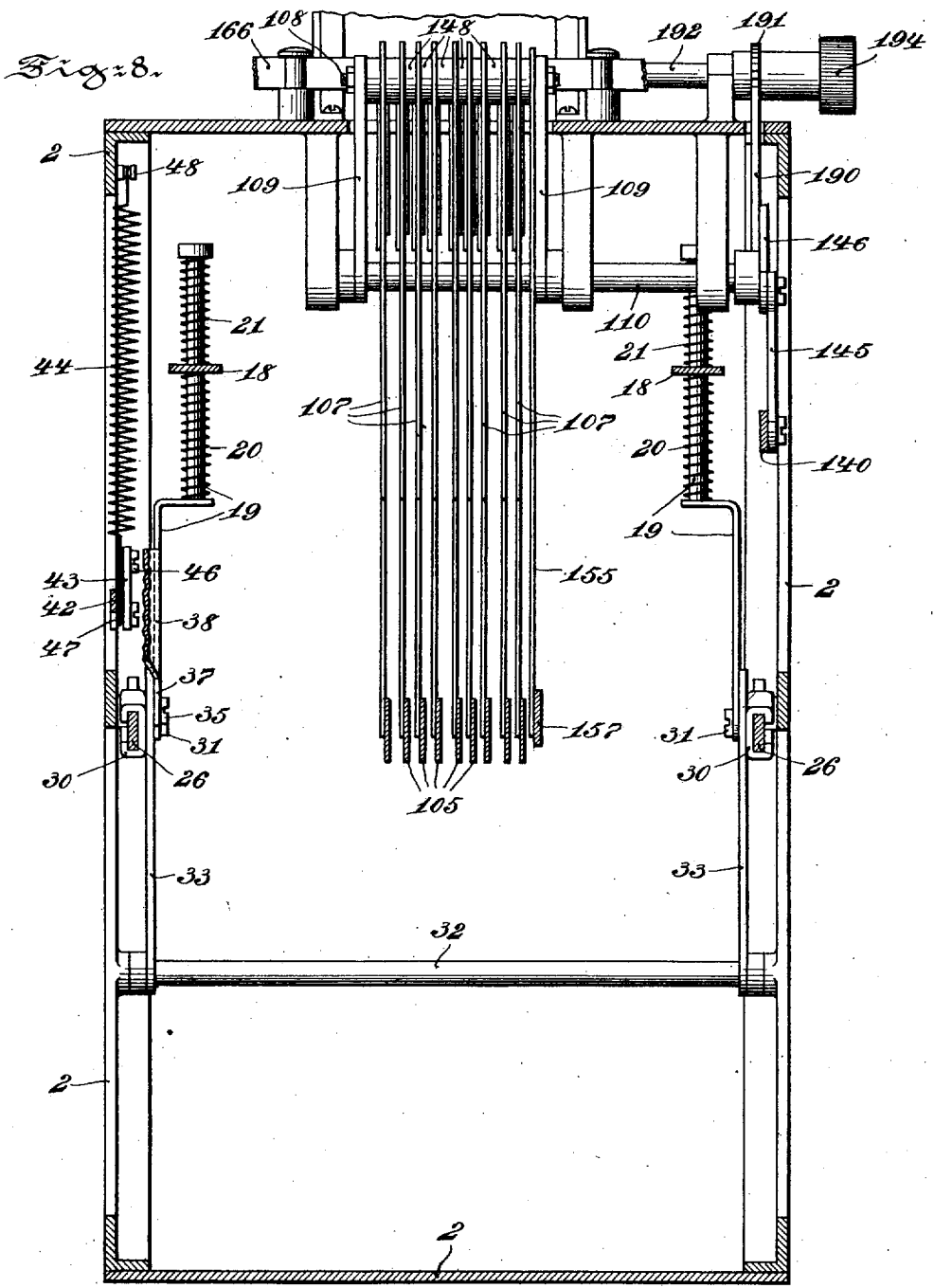

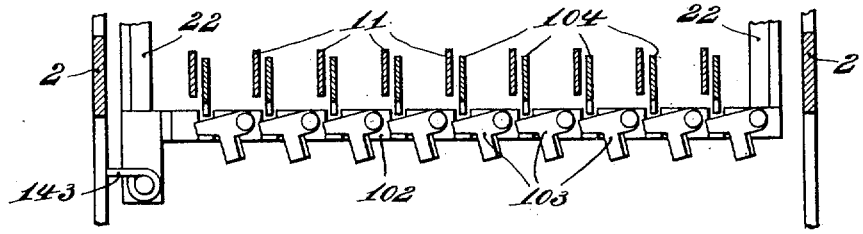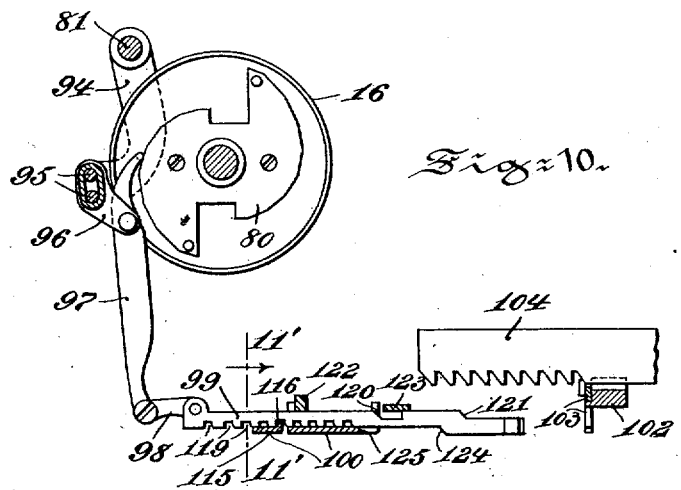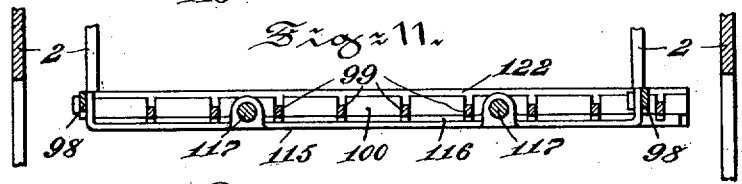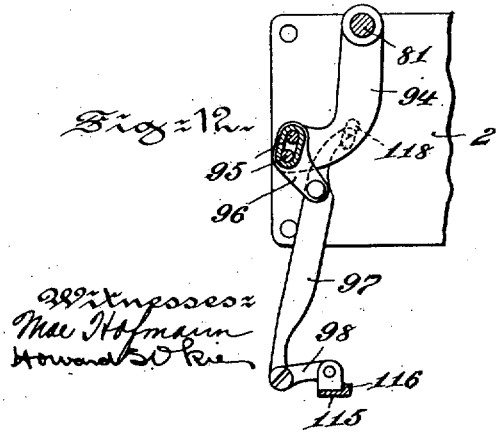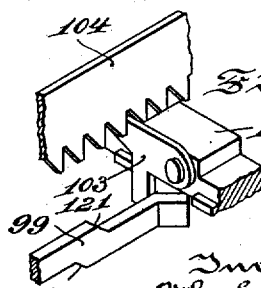

O. E. CLOUD & A. W. ALBERS.
CALCULATING MACHINE.
APPLICATION FILED JUNE 13, 1906.
976,152.
Patented Nov. 22, 1910.
11 SHEETS—SHEET 9.
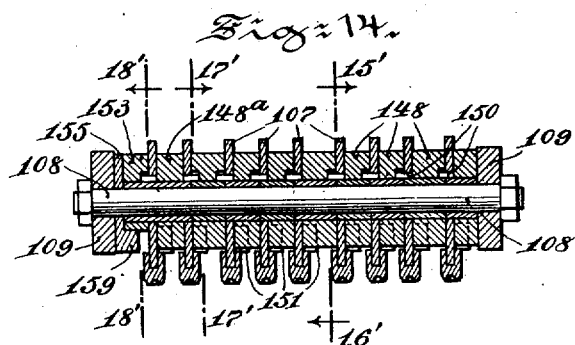
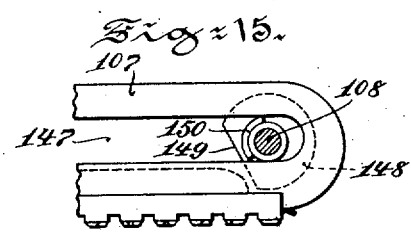
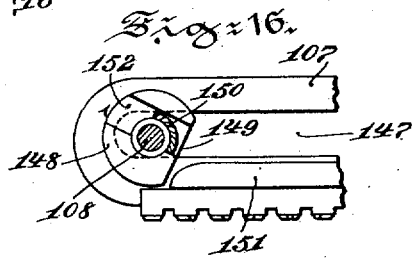
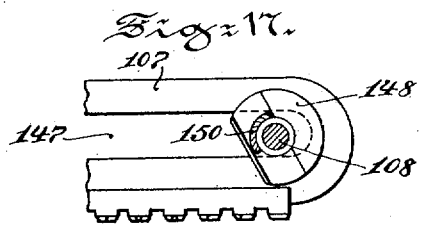
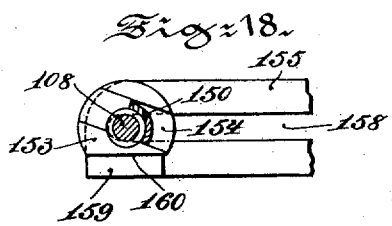
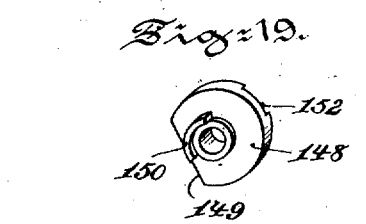
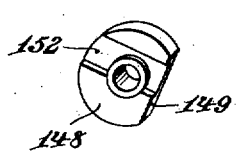
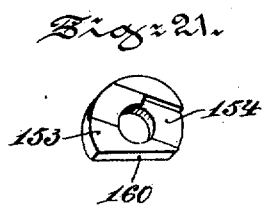

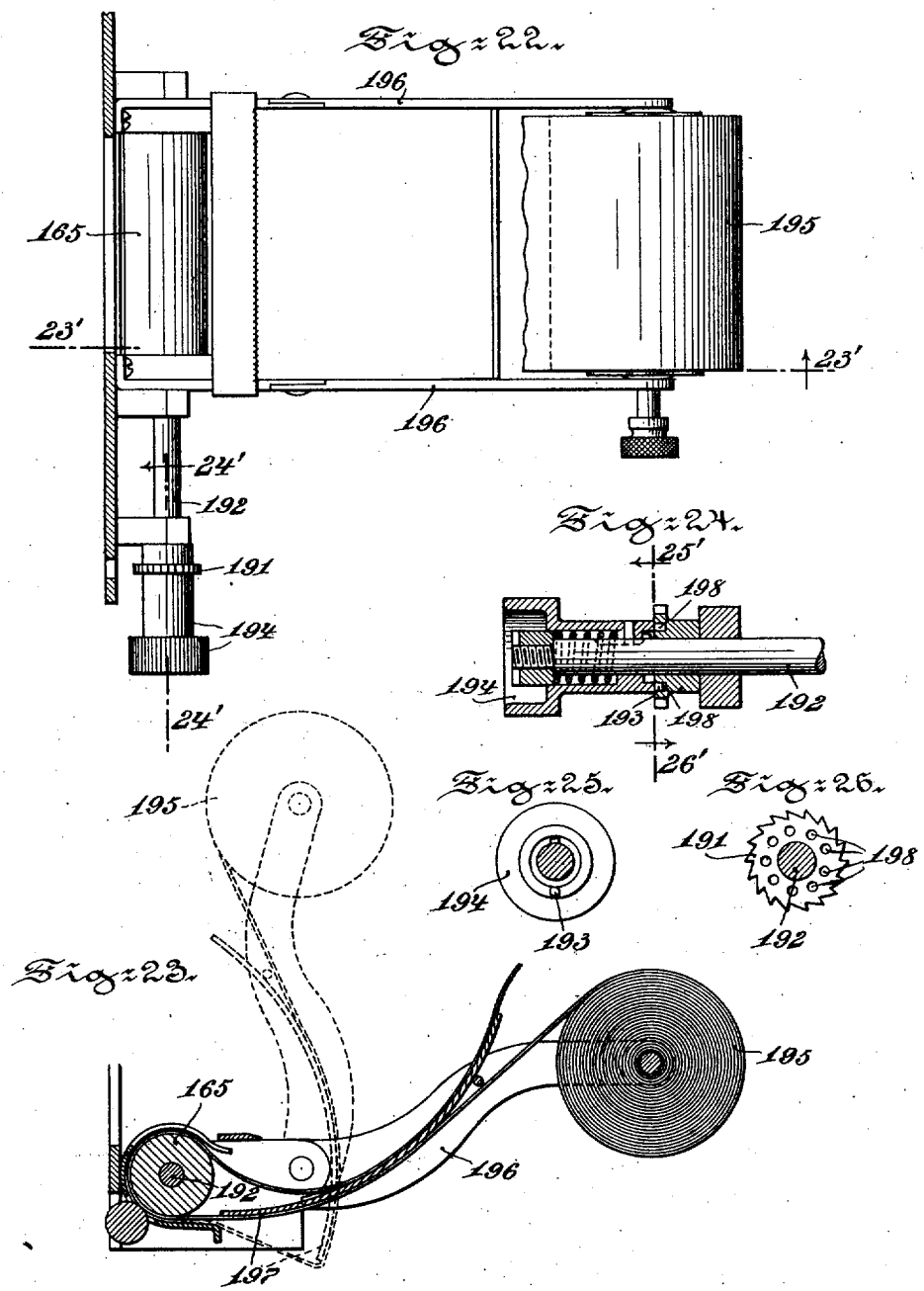

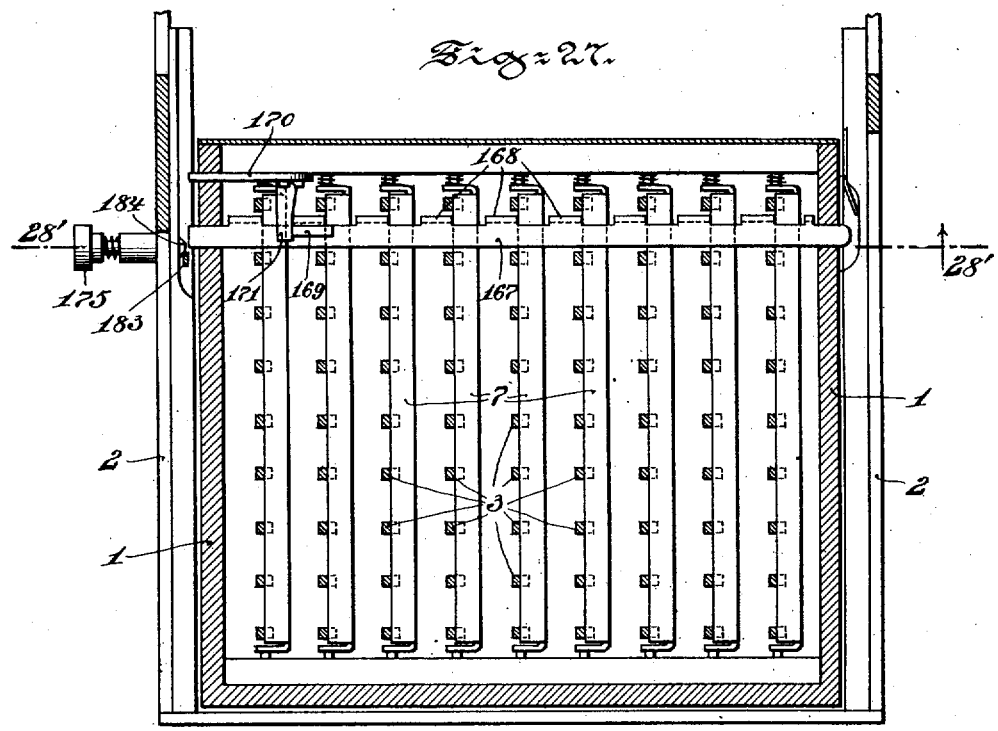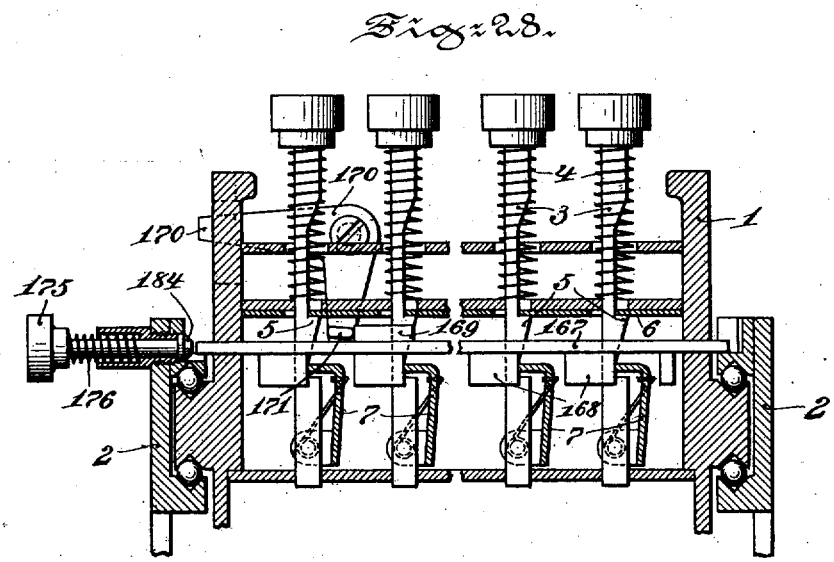

UNITED STATES PATENT OFFICE.

OTHO EDMUND CLOUD AND AUGUST W. ALBERS, OF PHILADELPHIA, PENNSYLVANIA; SAID ALBERS ASSIGNOR TO SAID CLOUD.

CALCULATING-MACHINE.

976,152.      Specification of Letters Patent.      Patented Nov. 22, 1910.

Application filed June 13, 1906. Serial No. 321,550.

*To all whom it may concern:*

Be it known that we, OTHO EDMUND CLOUD and AUGUST WILLIAM ALBERS, citizens of the United States, both residents of Philadelphia, county of Philadelphia, State of Pennsylvania, have invented a new and useful Calculating-Machine, of which the following is a specification.

Our invention relates to improvements in calculating machines.

Our object is to provide improved means for recording totals and returning dial wheels to zero, improved means for recording significant zeros, and improved means for accomplishing and recording various calculations.

Our invention comprises improvements upon the structure set forth in Letters Patent to Cloud and Wood, No. 746,924, dated Dec. 15, 1903, for improvements in calculating machines.

Referring to the drawings:—Figure 1 is a plan view of our device. Fig. 2 is a sectional view approximately on line 2', 3' of Fig. 1. Fig. 3 is a sectional view approximately on line 2', 3', of Fig. 1 from a view point opposite that of Fig. 2. Fig. 4 is a sectional view approximately on line 4', 4' of Fig. 1. Fig. 5 is a side elevation with the outer casing removed, and portions of the framework broken away. Fig. 6 is a detail of a portion of the mechanism shown in Fig. 5. Fig. 7 is a sectional plan view approximately on line 7', 7' of Fig. 2. Fig. 8 is a sectional plan view approximately on line 8', 8' of Fig. 2. Fig. 9 is a vertical section approximately on line 9', 9' of Fig. 7. Fig. 10 is a detail view of the totaling mechanism showing the parts in the operative position. Fig. 11 is a section on lines 11', 11' of Fig. 10. Fig. 12 is a detail of the locking device of the totaling mechanism. Fig. 13 is a perspective view of a portion of the totaling mechanism. Fig. 14 is a sectional view approximately on line 14', 14' of Fig. 3. Fig. 15 is a sectional view on line 15', 16' of Fig. 14 looking in the direction indicated by the arrow at 15'. Fig. 16 is a sectional view on line 15', 16' looking in the direction indicated by the arrow at 16'. Fig. 17 is a sectional view on line 17', 17' of Fig. 14. Fig. 18 is a sectional view on line 18', 18' of Fig. 14. Fig. 19 is a perspective view of one side of one of the rotative elements for effecting the printing of the significant zero. Fig. 20 is a perspective view of the other side of the same rotative element. Fig. 21 is a perspective view of the rotative element for returning the other rotative elements to initial position. Fig. 22 is a plan view of the paper carrying frame and adjuncts. Fig. 23 is a vertical section on lines 23', 23' of Fig. 22. Fig. 24 is a vertical section on an enlarged scale on line 24', 24' of Fig. 22. Fig. 25 is a section on line 25', 26' of Fig. 24 looking in the direction indicated by the arrow at 25'. Fig. 26 is a sectional view on line 25', 26' looking in the direction indicated by the arrow at 26'. Fig. 27 is a horizontal section on line 27', 27' of Fig. 2. Fig. 28 is a vertical section on an enlarged scale on line 28', 28' of Fig. 27.

Similar numerals refer to similar parts throughout the several views.

The general principle of operation of this device is substantially similar to that described in the patent to Cloud and Wood above mentioned, except as herein specified, described and illustrated. That is to say, the stems of the keys have such relation to the respective steps of the step bars and the respective racks connected therewith, and the pinions on the dial wheels coöperating with the racks as to secure a definite movement of the dial wheels by the keys depressed when the keyboard is reciprocated as described on page 2 of said Cloud and Wood patent. The transfer of movement from one dial wheel to the next higher dial wheel and so on is the same as shown in the said Cloud-Wood patent and described under the caption "Carrying mechanism" beginning at line 62, page 4 of the Cloud-Wood specification.

Our improvements may now be described as follows: Referring to Fig. 2, the keyboard 1 is horizontally movable in the frame work 2 of the machine. The keys 3 are vertically movable in said keyboard and are normally held in the elevated position by the springs 4. Each key is provided at its lower extension with the tapered lug 5, see Fig. 28, adapted to encounter the partition 6 to limit its upward movement and to be engaged by the spring controlled catch 7 when said key is depressed. The depressed key is adapted to encounter the corresponding step on step bar 8 when the keyboard is reciprocated in one direction. When the keyboard is returned to initial position the keys which have been depressed are automatically released to return to the normal elevated position by the following mechanism: The bar 167 is slidably mounted in the keyboard 1, see Figs. 27 and 28. This bar 167 is provided with the lugs 168 adapted to encounter the catches 7. Bar 167 is also provided upon its upper side with the lug 169. Pivotally secured to the rear wall of the keyboard is the bell crank member 170, having one end bent forward, as at 171, which is adapted to encounter lug 169 and normally rest against it. Pivotally secured to the frame work of the machine is the lever 172, see Fig. 4, controlled by the spring 173. Lever 172 is provided about midway of its extension with the incline projection 174, so positioned with respect to the end of horizontal portion of the bell crank lever 170 that upon the forward movement of the keyboard the bell crank lever will encounter the upper side of said incline projection 174, and will ride freely over the same. Upon the return movement of the keyboard the end of lever 170 will encounter the under side of said incline surface 174, and will be depressed thereby causing a corresponding movement of projection 171 of lever 170, which engaging with lug 169 of bar 167 will shift the bar to cause the actuation of latches 7 to release the depressed keys. This bar can also be arbitrarily operated by manually pressing the button 175 against tension of spring 176.

*Repeating mechanism.*—In computations requiring the repetition of the numbers corresponding to the keys depressed, for example the operations of multiplying and dividing, the following mechanism is provided for rendering inoperative the automatic release above described: The lever 177, see Fig. 4, is pivoted to the stationary framework at 178, and is so bent as to have a portion overlying a part of lever 172. Lever 177 is provided at its free end with the button 179 for manual operation. It will thus be obvious that the depression of lever 177 will cause a depression of lever 172 sufficient to bring the incline projection 174 out of the path of travel of lever 170. At the same time, the latch 180, pivoted to lever 177, and controlled by spring 181, engages with lug 182 of the stationary framework to maintain said lever 177, and consequently 172 in said depressed position. The latch 180 is also provided with the projection 183, adapted to lie when in latching position in the path of travel of the beveled end 184 of button member 175, so that by the engagement of said bevel with said lug 183 the latch 180 will be disengaged from lug 182, by which mechanism it is obvious that levers 177 and 172 may be arbitrarily released from their depressed position simultaneously with the release of the keys by the manual operation of button member 172.

Step-bar 8 is suitably supported upon the cross-bars 9 and 10 secured to the stationary framework. The latching member 130 is pivoted at 131 to the rack bar 8, and is provided with a lug 132, and a recess 133 for coöperation with cross-bar 10, and is also provided with catch 134 for coöperation with the serrated bar 135 secured to the keyboard. The member 130 is also provided with the extension 136. The forward movement of the step-bar causes the elevation of extension 136 and the resulting engagement of catch 134 with one of the serrations of bar 135 to lock the step-bar and keyboard together after they have assumed their proper relative positions. The purpose of so locking the step-bar and keyboard is to prevent any movement of the step-bar independent of the keyboard. The return movement of the keyboard and step-bar causes the engagement of lug 132 with cross-bar 10 to release catch 134 from serrated bar 135 and the consequent disengagement of step-bar from keyboard.

The rack bar 11 is pivotally connected at 12 with the step-bar 8 and is supported at its opposite end by the cross bar 13, which cross bar is supported at either end by members 14 pivoted to the stationary framework at 15; see Fig. 4. With the rack bar 11 in position shown in Fig. 2, its forward movement, or movement in the direction of the arrow in said figure, due to a corresponding movement of the step-bar 8 will cause a rotation of the dial wheel 16 in the direction indicated by the arrow in Fig. 2. The amount of movement of said dial wheel will depend upon which key is depressed, as is fully explained in said patent to Cloud and Wood. The depression of the cross bar 13 at the end of the forward movement of the rack 11 separates the rack from the pinion 17 of dial wheel 16, so that in its return movement rack 11 is free from said pinion. Secured to near the outer end of member 14 is the downwardly projecting member 18, apertured at its lower end to receive the rod 19 provided with the springs 20 and 21 adapted to bear against the opposite sides of member 18. In normal position as shown in Fig. 4, spring 21 is under compression and maintains through member 18 the cross bar 13 in the elevated position; that is, the position in which the rack bar 11 is in mesh with the pinion 17, as shown in Fig. 2. Secured to the downwardly projecting lug 22 of the keyboard 1, see Fig. 4, is the horizontal bar 23 suitably supported at its outer end by the stationary frame work. Bar 23 is provided with the wing or projection 24 while member 14 is provided with the coöperating lug 25.

The lever 26 is pivoted at 29 to the stationary frame work of the machine and is provided with the slot 28 through which projects the stud 27 from the lug 22 of the keyboard. Mounted on lever 26 is the slide 30. To slide 30 is pivotally secured at 31 the bar 19. Keyed to shaft 32 which is journaled in the stationary frame work, is lever 33. At the opposite end of lever 33 is provided the slot 34 through which passes the pivot 31 securing bar 19 to slide 30. At the same end of lever 33 above slot 34 is secured the pivot or stud 35 operating in slot 36 of extension 37 of the vertically movable member 38. This member 38 is guided by the studs 39 secured to the stationary frame work of the machine and passing through the slots 40 of said member 38. The upper extension of member 38 is provided with the button 41 for manual operation. The relative proportions and positions of levers 26, 33 and member 37 are such that the slide 30 shall have a movement on lever 26 from one side to the other of pivot 29 so that in one position for example, the position shown in Fig. 4, in which the slide is above the pivot 29, the forward movement of the keyboard 1 will compress spring 20 to depress cross bar 13. On the other hand by depressing member 38 the slide is operated through pivots 35 to travel along the lever 26 to the other side of pivot 29 whereupon the spring 20 is compressed and the cross bar 13 is thereby depressed and a forward movement of keyboard 1 will compress spring 21 to return cross bar 13 to normal position. The member 38 is maintained normally in the elevated position by the toggles 42 and 43 controlled by spring 44, toggle 42 being pivoted to member 38 at 45 while toggle 43 is pivoted to the stationary frame work at 46, said toggle members being joined at 47. The spring 44 is connected between toggle joint 47 and the stud 48 secured to the stationary frame work.

In the forward movement of keyboard 1 the lug 24 on member 23 encounters lug 25 on member 14 to prevent the responding of lever 18 to the force of spring 20 which is compressed by the forward movement of the keyboard. After the lug 24 has passed beneath lug 25 at the end of the forward stroke of keyboard 1 the lug and member 18 are free to respond to the force of spring 20 which has now received its maximum compression and cross bar 13 is consequently depressed. In the return movement of the keyboard the lug 24 passes over lug 25 and maintains the cross bar 13 in the depressed position against the gradually increasing force of the spring 21, until the lug 24 has passed beneath lug 25 and clear of same to the position shown in Fig. 4 when said member 18 is free to respond to spring 21 now under its maximum compression, to cause the elevation of cross bar 13 to the normal position. It will be understood that springs 20 and 21 are both slightly under compression to maintain a yielding operative connection between members 18 and 19. Cross bar 13 is supported at each end by a member 14 pivoted at 15 to the frame work of the machine and the same construction of parts 14, 18, and to 34 inclusive is found on both sides of the machine.

The actuation of 33 and consequently of slide 30 on one side of the machine, is caused by the depression of member 38. This causes a corresponding actuation of lever 33 and slide 30 on the opposite side of the machine, through shaft 32, to which both levers 33 are keyed.

The lug 202 secured to member 38, see Fig. 4, is adapted to coöperate with the projecting ledge 203 on member 23 to prevent either the depression or elevation of member 38 except when the keyboard is either in its extreme forward or backward position. To bracket 105, which is rigidly secured to step bar 8, is pivotally connected at 106 the type bar 107, which is slidably supported at its free end by a cross bar 108, secured to the levers 109, pivotally connected at 110 to the stationary framework. This type bar is consequently shifted with its respective step bar to present the proper type to print as hereafter described.

*Transfer mechanism.*—Upon the movement of any dial wheel one-half a revolution of ten figures it is necessary that a figure be transferred to the next higher dial wheel. To accomplish which we provide the following mechanism: On the side of each dial wheel 16 project the pins 49 and 50 adapted to encounter the catch 51 which is connected through lever 52 with rack 53 of the next higher dial wheel. These pins 49 and 50 are so positioned with respect to the figures on the dial wheels that when the zero comes into the reading line pin 50 encounters catch 51 to disengage the same from cross bar 54, whereupon rack 53 which is slidably supported at its outer end by the cross bar 55 is moved forward one tooth, while out of engagement with pinion 17. The cross bar 55 is supported at either end by the arms 56 which are pivoted at 57 to the frame work of the machine. The arms 56 are also connected by the connecting bar 58 to member 14 so that when the keyboard reaches the end of its forward or backward movement the cross bar 55 is elevated or depressed as the case may be, in the same way that cross bar 13 is moved. In normal position as shown in Fig. 2, at the end of the forward movement of the keyboard, cross bar 55 drops and brings the rack bar 53 into mesh with pinion 17, so that upon the return movement of the keyboard, the rack is carried back by the engagement of cross bar 59, which is actuated in the manner hereinafter to be described. This causes the movement of said dial wheel one figure. At the same time the catch 51 is brought back to initial position in engagement with cross-bar 54. The rod 59 is supported at each end by lever 70, which is pivoted to the frame work at 71. A second rod 72 is connected between the levers 70 simply to stiffen the structure. At the lower end of lever 70 is pivotally secured the latch 73 having an upwardly projecting lug 74, to which is secured one end of spring 75, the other end of which is secured at 76 to the stationary framework. Secured to the member 23, which reciprocates with the movable key board, is the lug 77. In the forward movement of the key board, this lug 77 is carried beyond the free end of latch 73. Upon the return movement of the keyboard lug 77 encounters the end of latch 73 causing the movement of lever 70 against the pull of spring 75. This causes the necessary movement of bar 59 to actuate rack bar 53 as above described. At the end of the forward movement of the keyboard, as above described, the member 14 drops, carrying lug 25 below lug 24, so that in the return movement of the keyboard lug 24 passes over lug 25. At the end of the return movement of the keyboard member 14 is elevated as above described and lug 25 encounters latch 73 to free it from engagement with lug 77, so that lever 70 may respond to the actuation of spring 75 to return bar 59 to normal position.

When the catch 51 is disengaged from bar 54 the lower end of pivoted member 52 encounters the cross bar 60 which is connected at either end with the lever 61, which is pivoted to the stationary framework at 62. The other end of lever 61 is connected at 63 by slot and pin engagement with one arm of bell crank 64, said bell crank being journaled at 65. The other arm of the bell crank supports the end of the shutter 66, so that when the transfer mechanism is being operated, the engagement of lever 52 with cross bar 60 causes the elevation of lever 61 to move the shutter into the position covering the exposed numerals on the dial wheels. When the lever 52 is returned to normal position the shutter will be carried back to its normal position by the engagement of the hub of latch 73 with the spring 205 which is secured to shaft 60. It is also to be noted that lever 61 is provided with an upwardly projecting lug 67 which is encountered by lug 68 of member 38 to prevent the actuation of member 28 during the operation of the carrying mechanism.

*Totaling mechanism.*—Journaled at either end in the stationary framework, is a shaft 81, to which shaft 81 is keyed the lever 82; see Fig. 4. At the free end of lever 82 is secured the stud 83, which operates in the slot 84 of lever 85, which is pivotally secured at 86 to the stationary framework, and is provided at its other free end with the vertically projecting button member pivoted thereto at 88. The spring 89 is secured to lever 85 at one end and to the stationary frame work at the other end. From the construction thus described it will be evident that the depression of button member 87 will cause a partial rotation of shaft 81. The spring 89 is adapted to return said mechanism to normal position in engagement with the limiting stud 90. The stud 91, projecting from member 38, is adapted to be encountered by lever 85 so that the depression of button member 87 causes the depression of member 38 and the associated mechanism heretofore described. The stud 92 on lever 85 is adapted to assume such position with respect to notch 93, when button member 87 is depressed, as to prevent the independent movement of 87 with respect to 38.

Keyed to shaft 81, see Figs. 3 and 10, are a series of brackets 94. Carried at the lower end of brackets 94 are the rods 95, carrying a series of brackets 96, one for each dial wheel. At the lower end of each bracket 96 is pivotally secured the lever 97, to the lower end of which is pivotally secured the link 98, to which link is also pivotally secured the totaling bar 99. The outer end of said bar 99 is slidably supported by the cross bar 100, which is secured to the stationary framework.

Each dial wheel 16 is provided with the cam plate 80. The rotation of shaft 81, caused by the depression of button member 87 causes the swinging of the lower end of bracket 94 toward the dial wheel, and the consequent movement of the upper end of lever 97, into engagement with the periphery of said cam plate. The formation and position of the cam plate 80 is such, with respect to the several numerals on the dial wheel, as to maintain the lever 97, which is in engagement with the periphery of said cam, in a position, and consequently bar 99 in a position relative to the position of its respective dial wheel. The brackets 96 are all shifted the same distance by the depression of the button member 87, and the upper end of lever 97 encountering the cam surface of cam member 80 will cause the lower end of member 97 to be shifted and consequently the bar 99, a distance corresponding to the number on the dial wheel, see especially Fig. 10. Secured to the keyboard is the bar 102, see Figs. 3, 7 and 10. To this bar 102 are secured a series of pawls 103, one for each step bar. Each pawl is so positioned and beveled as to be encountered and raised by its respective bar 99, to engage with the serrated bar 104, which is integral with step bar 8. As above stated, the bar 99 will be advanced to a position having a certain relationship to the numeral indicated by the dial wheel; so that when the keyboard is moved forward, the pawl 103 will encounter said bar 99 and lock the bar 102 with the step bar 8 in such tooth of the serrated bar 104 as shall correspond with the numeral indicated by the dial wheel. So that when the keyboard is carried to the forward position the typebar will be brought to position corresponding to position indicated by its respective dial wheel.

*Automatic locking mechanism for totaling bars.*—The bar 115, having an upturned edge 116, is slidably mounted on the horizontal rods 117. This bar is pivotally connected at each end through a link 98 to a member 97 having its upper end movable in a slot 118, see Fig. 12, in the stationary framework, to maintain said end constantly in the position corresponding to numeral 9 on the dial wheel, so that, with each rocking movement of shaft 81, the lock bar 115 will have a full reciprocation equal to the full reciprocation of the totaling bar for the whole nine numerals. The totaling bar 99 has a series of notches 119 adapted to engage the upturned edge 116 of bar 115. Totaling bar 99 is also provided upon its upper side with the inclined surfaces 120 and 121 adapted to engage respectively the bars 122 and 123 for the purpose of depressing bar 99 as the same is moved forward to effect the engagement of the proper notch 119 with the bar 115. Upon the under side of bar 99 is provided the inclined surface 124 adapted to encounter inclined surface 125 of bar 100, so that in the return movement of bar 99, the engagement of the inclined surfaces 124 and 125, coöperating with the engagement between the top of the bar 99 and bar 123, serves to elevate the bar 99 to normal position out of engagement with lock bar 115. The operation of this mechanism is as follows: Upon depressing the button 87, the locking bar 115 will begin to move forward while the totaling bars will not start to move until their respective levers 97 have come into engagement with the surface of cam 80, whereupon the totaling bar will be depressed in the manner above explained, and the relative notch will engage the edge 116 of lock bar 115 and lock bar and totaling bar will complete the forward movement in the locked position. The purpose of this locking mechanism is to secure the positive engagement of pawl 103 with the serration on the rack bar 11, having fixed relationship with the notch 116 of the totaling bar.

*Automatic release of keys and repeating mechanism in totaling.*—In the totaling operation it is necessary to release any of the keys which may be depressed in the keyboard as well as the repeating mechanism. This is accomplished by the following mechanism: Lever 85 is provided with the extension 185, provided with a lug 186, adapted to encounter the free end of lever 172, so that by the depression of button member 87, lug 186 will depress member 172, so that lug 187 carried thereby will encounter lever 170 to cause its actuation to operate bar 167 to release the keys. At the same time the projection 188 of member 172 will encounter latch member 180 to disengage same from lug 182, to permit the return of lever 177 to normal position.

*Returning dials to zero.*—As herein before described when member 38 is depressed the rack bar 11 will be carried forward out of engagement with pinion 17 and returned in engagement with pinion 17, so that when the step bar is locked with the keyboard by pawl 103 in a position corresponding to the numeral indicated by its respective dial wheel, it results that the return of the keyboard will cause the return of the dial wheel to zero. By returning dials to zero is meant returning of the wheels to such position that the zero thereon will be exposed or be visible through the window 200, which is preferably protected by glass, set in the framework at an inclination most convenient for the inspection of the operator when standing in the operating position.

*Printing.*—Lever 26, see Fig. 5, on the other side of the machine from that already described, is mounted on pivot 29, and connected with stud 27, and is operated in the same way as has already been described with respect to the other lever 26. To lever 26, shown in Fig. 5, is pivoted at 137 the slide box 138, through which projects one end of rod 139, the other end of which is pivoted to lever 140. The spring 141 surrounds rod 139 and is adapted to be compressed by the forward movement of the keyboard to exert pressure on lever 140. Lever 140 is held in normal position against said spring pressure by latch 142 until lug 143 in the forward movement of the keyboard encounters projection 144 of latch member 142 to cause the actuation of said latch member to release lever 140 to respond to the actuation of spring 141 when the same is under maximum compression. The link member 145 connects lever 140 with T-lever 146. T-lever 146 is keyed to shaft 110, to which is keyed levers 109, see Fig. 3, carrying at their outer free ends the cross bar 108, which passes through slots 147 of type bars 107, whereby the type bars are raised and then lowered with the necessary impact to cause the printing of the desired figures by impinging the paper on roll 165 through ribbon 166.

*Significant zero mechanism.*—Mounted on cross-bar 108 are the rotative elements 148, lying between the type bars. Each element 148 is provided with a flat surface 149 in its periphery, and a sector shaped projection or lug 150 near its hub. The type bar is provided with a horizontal lug 151 adapted to coact with the flat surface 149 of element 148 when said type bar is moved forward, to cause a partial rotation of element 148. This partial rotation of 148 causes a downward movement of lug 150 which engages the lower side of slot 147 and depresses the type bar a distance equal to the thickness of lug 150. The sector shaped lug 150 also projects into a recess 152 in the adjoining element 148, which operates the type bar of the next lower order of digits, so that the rotation of the first element 148 will cause the rotation of all the lower rotative elements. Now this will cause a depression of all the type-bars below the highest type bar actuated, so that all of said lower bars not otherwise actuated will print the significant zero. It is to be noted that the reason this slight depression of the type bars carrying the significant zero is sufficient to effect the printing, is due to the adjustment of screw 167, which forms a stop to the downward movement of lever 109, so that the type bars which are not depressed in the manner above described will not reach the paper upon such downward movement of lever 109, while the type bars which are so actuated by the sector shaped lugs on the rotative elements, will print.

In calculating machines adapted to compute in decimals, it is desirable, where, for instance, two decimals are used, in printing the lowest figure, to also print the significant zero above it. For instance 05, to represent five one hundredths. For the purpose of printing the significant zero above a lower decimal, which in the device illustrated is next above the lowest type bar, we provide the rotative element 148$^a$ with a sector lug 150 on either side, so that when the lowest type bar actuates element 148$^a$, one sector lug 150 will cause a depression of said type bar, while the other sector lug 150 will cause a depression of the type bar next above it to print the significant zero. The rotative element 153 is provided with a recess 154 to receive the sector shaped lug of the rotative element 148$^a$, to cause the return to initial position of said rotative element and through it all of the other rotative elements, which have been actuated, upon the return to initial position of rotative element 153. It is, of course, understood that the relation between said member 153 and member 148$^a$ is such as to cause the partial rotation of said member 153 whenever any rotative element above it has been actuated.

The return of rotative element 153 to initial position is accomplished in the following manner: The bar 155 is pivoted at 156 to the extension 157 of the keyboard, and is provided with the slot 158 through which bar 108 passes. Bar 156 is also provided at its outer lower extension with the lug 159 for co-acting with the flat surface 160 of element 153. It will be understood that immediately upon the forward movement of the keyboard, bar 155 will be carried forward carrying lug 159 free from element 153, so that the same may be actuated by the mechanisms, and in the manner above described. Upon the return of the keyboard to initial position, bar 155 will be actuated to bring lug 159 to engage surface 160 of element 153 to bring it into the initial position shown in Fig. 18, thus returning to initial position, as in the manner above described, all of the other rotative elements which have been operated.

*Paper feed.*—To the lower extension of T-lever 146 above described is pivotally secured the pawl 190, which is adapted to co-operate with the ratchet 191, loosely mounted on shaft 192, which is keyed to the feed roll 165. Ratchet 191 is provided with a series of apertures 198, adapted to receive the projection 193, carried by the knob 194, which is feathered to shaft 192, and has a spring controlled longitudinal movement thereon, so that said knob may be withdrawn from operative engagement with the ratchet for the arbitrary operation of the feed roll. When the ratchet is in operative engagement with shaft 192, through knob 194, the reciprocation of pawl 190, caused by the oscillation of member 146 in the manner above explained, will move the paper forward after each printing operation. The paper is fed to the feed roller 165 from paper roll 195, carried at the end of frame work 196, jointed midway its extension so as to permit the same to be thrown in the position indicated in dotted line in Fig. 23.

*Operation.*—By depressing button member 87 until wing 203 has engaged lug 202 in the forward movement of the keyboard, and then removing the hand from button member 87 during the remainder of the forward movement of the keyboard it will be seen that at the end of the forward movement of the keyboard, lug 202 of member 38 will pass from under wing 203 and permit the elevation of 38 and associated mechanism. This results in the printing of any figures indicated on the dial wheel without disturbing said figures or returning said dial wheels to zero, it often being desirable to retain said figures on dial wheels for various reasons. By depressing button 41 of member 38 until lug 202 is engaged by wing 203 in the forward movement of the keyboard, member 38 and its associated mechanism, not including the totaling mechanism, is maintained depressed until the end of the forward stroke of the keyboard. This causes the depression of rack member 11 so that the same will move forward without operating the dial wheel. At the end of the forward movement of the keyboard, the member 38 is released, causing the elevation of the rack member 11 to actuate the dial wheel in the reverse direction, for the purpose of correcting mistakes.

What we claim is:—

1. In a calculating machine, the combination of a reciprocative keyboard provided with a plurality of sets of depressible keys, movable step bars for coöperation therewith, and automatic means for locking the keyboard with the step bars after they have been encountered by the keys.

2. In a calculating machine, the combination of a reciprocative keyboard provided with a plurality of sets of depressible keys, movable step bars for coöperation therewith, automatic means for locking the keyboard with the step bars after they have been encountered by the keys, and automatic means for releasing the same, after the keyboard has been reciprocated.

3. In a calculating machine, the combination of a reciprocative keyboard provided with a plurality of sets of depressible keys, a plurality of dial wheels, rack and pinion means for operating same, spring controlled means operated by the keyboard for moving the rack into and out of engagement with the pinion, and a slide joint connection between the keyboard and said spring controlled means.

4. In a calculating machine, the combination of a reciprocative keyboard provided with a plurality of sets of depressible keys, a plurality of dial wheels, rack and pinion means for operating same, spring controlled means operated by the keyboard for moving the rack into and out of engagement with the pinion, a slide connection between the keyboard and said spring controlled means, and manually operating means for shifting the position of said slide joint connection.

5. In a calculating machine the combination of a reciprocative key board provided with a plurality of sets of depressible keys, a plurality of dial wheels, rack and pinion means for operating the dial wheels, a movable bar for supporting the racks either in or out of engagement with the pinions, a mechanism connected between the keyboard and the movable bar for causing the elevation and depression of said bar with each reciprocation of the key board, said mechanism including a lever pivoted near its lower end to the stationary frame work, having a slot and pin engagement with the key board, a slide mounted on said lever adapted to travel from one side to the other of the pivot connection, a rod pivoted to said slide, and having a spring controlled connection with said bar member, and a hand operated member for shifting the position of the slide.

6. In a calculating machine the combination of a reciprocative key board provided with a plurality of sets of depressible keys, a plurality of dial wheels, rack and pinion means for operating the dial wheels, a movable bar for supporting the racks either in or out of engagement with the pinions, a mechanism connected between the key board and the movable bar for causing the elevation and depression of said bar with each reciprocation of the key board, said mechanism including a lever pivoted near its lower end to the stationary frame work, having a slot and pin engagement with the key board, a slide mounted on said lever adapted to travel from one side to the other of the pivot connection, a rod pivoted to said slide, and having a spring controlled connection with said bar member, a hand operated member for shifting the position of the slide, and automatic means for locking said shifting member upon the movement of the key board.

7. In a calculating machine the combination of a reciprocative key board provided with a plurality of sets of depressible keys, a plurality of dial wheels, rack and pinion means for operating the dial wheels, a movable bar for supporting the racks either in or out of engagement with the pinions, a mechanism connected between the key board and the movable bar for causing the elevation and depression of said bar with each reciprocation of the key board, said mechanism including a lever pivoted near its lower end to the stationary frame work, having a slot and pin engagement with the key board, a slide mounted on said lever adapted to travel from one side to the other of the pivot connection, a rod pivoted to said slide, and having a spring controlled connection with said bar member, a hand operated member for shifting the position of the slide, and spring controlled toggle means for normally maintaining shifting lever in elevated position.

8. In a calculating machine the combination of a plurality of dial wheels, rack and pinion means for operating the dial wheels, a step bar for each rack, a reciprocative key board provided with a plurality of sets of depressible keys, said keys adapted to engage the step bars in any desired relative position, automatic means for also locking the step bar, and consequently the rack bar, in positions relative to the respective positions of their dial wheels to cause the return of the dial wheels to zero upon reciprocating the key board, and a hand operated member for rendering operative said automatic means.

9. In a calculating machine the combination of a plurality of dial wheels, rack and pinion means for operating the same, a reciprocative key board having a plurality of sets of depressible keys for establishing the desired relationship between the key board and racks to cause the dial wheels to indicate the desired number, a series of type bars having constant relation with the racks, and means for automatically locking the key board with the different racks, and consequently the type bars, in such relative positions as to their respective dial wheels to cause the printing of the total indicated on said dial wheels, and also to return the dial to zero upon reciprocating the key board, and hand operated member for rendering operative said automatic means.

10. In a calculating machine the combination of a plurality of dial wheels, rack and pinion means for operating the dial wheels, a step bar for each rack, a reciprocative key board provided with a plurality of sets of depressible keys, said keys adapted to engage the step bars in any desired relative position, automatic means for also locking the step bar, and consequently the rack bar, in positions relative to the respective positions of their dial wheels to cause the return of the dial wheels to zero upon reciprocating the key board, a hand operated member for rendering operative said automatic means, and means for locking in the operative position said automatic means upon the movement of the key board.

11. In a calculating machine the combination of a plurality of type bars, means for moving the same to printing positions, and means for causing the printing of the significant zero of all bars below the highest one actuated, comprising a series of rotative elements, each having a flat surface in its periphery adapted to be engaged by the lug of a type bar when moved, and each having a sector shaped lug near its hub to cause the depression of the adjacent type bar when so rotated by its own type bar.

12. A plurality of type bars, means for moving the same to the printing position, and mechanism for printing the significant zero, comprising a series of rotative elements, one for each type bar, each provided with a flat surface on its periphery adapted to be encountered by a lug on a type bar when the same is moved forward, each rotative element being provided with a sector shaped lug near its hub adapted to project into a recess in the adjoining type bar, so that when said element is rotated the adjoining type bar will be depressed.

13. A plurality of type bars, means for moving the same to the printing position, a mechanism for printing the significant zero, comprising a series of rotative elements, one for each type bar, each provided with a flat surface on its periphery adapted to be encountered by a lug on a type bar when the same is moved forward, each rotative element being provided with a sector shaped lug near its hub adapted to project into a recess in the adjoining type bar, so that when the said element is rotated, the adjoining type bar will be depressed, and each rotative element also provided with a recess in which projects the sector shaped lug of the adjoining rotative element above, so that when one element is actuated, all of the elements numerically below said element are also actuated.

14. A plurality of type bars, means for moving the same to the printing position, a mechanism for printing the significant zero, comprising a series of rotative elements, one for each type bar, each provided with a flat surface on its periphery adapted to be encountered by a lug on a type bar when the same is moved forward, each rotative element being provided with a sector shaped lug near its hub adapted to project into a recess in the adjoining type bar, so that when said element is rotated the adjoining type bar will be depressed, and automatic means for returning said rotative elements to initial position when the type bars are returned to initial position.

15. In a calculating machine the combination of a plurality of dial wheels, rack and pinion means for operating the same, a reciprocative key board provided with a plurality of sets of depressible keys for establishing such relationship between the key board and the various racks as to cause the dial wheels to indicate the desired number upon reciprocating the key board, a series of type bars having constant relationship with the rack bars, and means for automatically locking the key board with the different racks and type bars in positions relative to their respective dial wheels, comprising a cam carried by each dial wheel, and a totaling rod actuated thereby, a series of pawls on the key board, and a serrated member connected with each rack bar, the parts so related that the pawl will be actuated by the totaling rod to engage the serration having the desired relation with the number indicated on the dial wheel.

16. In a calculating machine the combination of a plurality of dial wheels, rack and pinion means for operating the same, a reciprocative key board provided with a plurality of sets of depressible keys for establishing such relationship between the key board and the various racks as to cause the dial wheels to indicate the desired number upon reciprocating the key board, a series of type bars having constant relationship with the rack bars, a means for automatically locking the key board with the different racks and type bars in positions relative to their respective dial wheels, comprising a cam carried by each dial wheel, and a totaling rod actuated thereby, a series of pawls on the key board, and a serrated member connected with each rack bar, the parts so related that the pawl will be actuated by the totaling rod to engage the serration having the desired relation with the number indicated on the dial wheel, and a manually operated and pivotally supported member for throwing into the operative position said totaling mechanism, and at the same time actuating the mechanism for reversing the operation of the rack member to return the dial wheels to zero.

17. In a calculating machine, in combination with mechanism for printing the total indicated on the dials, a hand operated totaling lever for rendering operative said totaling mechanism, a reciprocative key board provided with a plurality of sets of depressible keys, spring means for returning the keys to the elevated position, latching means for engaging the keys in the depressed position, automatic means for releasing the keys at the end of the full reciprocation of the key board, manually operative means for rendering inoperative the automatic releasing means, and mechanism operated by the totaling lever for disengaging the last mentioned manually operative means, and at the same time actuating the latching means to release the keys.

18. In a calculating machine the combination of a plurality of dial wheels, rack and pinion means for operating said dial wheels, a reciprocative key board provided with a plurality of sets of depressible keys, a depressible member and mechanism connected therewith for changing the direction of actuation of the dial wheels relative to the direction of the movement of the key board, and spring controlled toggle mechanism for normally maintaining the depressible member in the elevated position.

19. In a calculating machine the combination of a plurality of dial wheels, rack and pinion means for operating said dial wheels, a reciprocative key board provided with a plurality of sets of depressible keys, a depressible member and mechanism connected therewith for changing the direction of actuation of the dial wheels relative to the direction of the movement of the key board, and locking means for preventing the movement of said depressible member in either direction except when the key board is either in initial position or in the extreme forward position.

20. In a calculating machine the combination of a plurality of dial wheels, rack and pinion means for operating said dial wheels, a reciprocative key board having a plurality of sets of depressible keys, a depressible member and mechanism connected therewith for reversing the direction of actuation of the dial wheels, carrying mechanism for transferring a number from one dial wheel to another, and locking means for preventing the depression of the depressible member during the carrying operation.

21. In a calculating machine the combination of a reciprocative key board having a plurality of sets of depressible keys, a plurality of type bars actuated thereby, means for causing a downward stroke of the type bars to print, and means actuated by the type bar of the highest ordinal moved for depressing the next lower type bar to cause the printing of the significant zero.

22. In a calculating machine the combination of a reciprocative key board having a plurality of sets of depressible keys, a plurality of type bars actuated thereby, means for causing a downward stroke of the type bars to print, means, actuated by the type bar of the highest ordinal moved, for depressing the next lower type bar to cause the printing of the significant zero, and means for communicating the said movement through all the lower type bars, not otherwise moved, to cause the printing of all significant zeros.

23. In a calculating machine the combination of a reciprocative key board provided with a plurality of sets of depressible keys, a plurality of dial wheels, a mechanism intermediate said wheels and keys for causing the rotation of the wheels, carrying mechanism for transferring from one dial wheel to another, type bars also operated by the depressible keys and intermediate mechanism, and automatic mechanism for locking the type bars with the key board in a relationship corresponding to the numerals indicated by the respective dials.

24. In a calculating machine the combination of a reciprocative key board provided with a plurality of sets of depressible keys, a plurality of dial wheels, mechanism intermediate said wheels and keys for causing the rotation of the wheels, carrying mechanism for transferring from one dial wheel to another, type bars also operated by the depressible keys and intermediate mechanism, and automatic mechanism for locking the type bars with the key board in a relationship corresponding to the numerals indicated by the respective dials, so that the forward movement of the key board will cause the printing of the total indicated on the dials.

25. In a calculating machine the combination of a reciprocative key board provided with a plurality of sets of depressible keys, a plurality of dial wheels, rack and pinion mechanism operating between the depressible keys and the dial wheels, carrying means for transferring from one dial wheel to another, a plurality of type bars also operated by the depressible keys and intermediate mechanism, automatic mechanism for locking the type bars with the key board in a relationship corresponding to the numerals indicated by the dial wheels, so that the forward movement of the key board will cause the printing of the total indicated on the dials, and means whereby the rack and pinion means will operate to return the dials to zero upon the return movement of the key board.

26. In a calculating machine the combination of a reciprocative key board provided with a plurality of sets of depressible keys, a plurality of type bars actuated thereby, means for causing the downward stroke of the type bars, adjustable means for limiting the said downward stroke, and means actuated by the type bar of the highest ordinal moved by the key board, for depressing all lower type bars not otherwise moved to print the significant zero.

27. In a calculating machine the combination of a reciprocative key board provided with a plurality of sets of depressible keys, a plurality of type bars adapted to be actuated thereby, means for causing a downward stroke of the type bars, means for limiting said stroke, and mechanism operated by the type bar of the highest ordinal for depressing all lower type bars not actuated by the depressible keys to print the significant zeros.

28. In a calculating machine the combination of a reciprocative key board provided with a plurality of sets of depressible keys, a plurality of type bars adapted to be actuated thereby, means for causing a downward stroke of the type bars, means for limiting said stroke, and mechanism operated by the lowest type bar below the decimal point for depressing all type bars between said lowest bar and the decimal point not actuated by the key board to cause the printing of the significant zero.

29. In a calculating machine the combination of a reciprocative key board provided with a plurality of sets of depressible keys, a plurality of type bars adapted to be actuated thereby, means for causing a downward stroke of the type bars, means for limiting said stroke, mechanism operated by the type bar of the highest ordinal for depressing all lower type bars not actuated by the depressible keys, to print the significant zeros, and means for returning said mechanism to normal position.

30. In a calculating machine, the combination of a reciprocative keyboard provided with a plurality of sets of depressible keys, a plurality of dial wheels, rack and pinion means operating between the dial wheels and depressible keys, a plurality of type bars also operated by the depressible keys, and mechanism for moving the type bars into positions relative to the numerals indicated by the dials, upon the advance movement of the keyboard, to cause the printing of the total indicated on the dial wheel, said mechanism including a cam connected with each dial wheel, a total rod for each dial wheel, intermediate mechanism controlled by the position of the cam for moving the total rod to a relative position, and a locking pawl actuated by the total rod for locking the type bar with the keyboard in the required relative position.

31. In a calculating machine, the combination of a plurality of dial wheels, rack and pinion means for operating the same, normally inactive means for returning the dial wheels to zero, comprising a cam for each dial wheel having a periphery relative to the numerals on the dial wheel, a lever co-acting with the cam, and connecting mechanism for causing a shifting of the rack to a position relative to the numeral indicated on the dial, and manually operative means for rendering active said normally inactive means.

32. In a calculating machine, the combination of a plurality of dial wheels, rack and pinion means for operating the same, a reciprocating keyboard, cam-controlled normally inactive means for engaging the rack with the keyboard in a position relative to the numeral indicated on the dial wheel.

33. In a calculating machine, the combination of a plurality of dial wheels, rack and pinion means for operating the same, a reciprocating keyboard, cam-controlled normally inactive means for engaging the rack with the keyboard in a position relative to the numeral indicated on the dial wheel, and automatic means for locking said parts in said relative positions during the reciprocation of the keyboard.

34. In a calculating machine, the combination of a plurality of dial wheels, rack and pinion means for operating each dial wheel, a reciprocating keyboard, cam-controlled normally inactive means for engaging the rack with the keyboard in a position relative to the numeral indicated by the dial wheel, comprising a lever co-acting with the cam, a totaling bar linked to the lever, a pawl secured to the keyboard and operated by the totaling bar and serrations on the rack bar for engagement by the pawl.

35. In a calculating machine, the combination of a plurality of dial wheels, rack and pinion means for operating each dial wheel, a reciprocating keyboard, cam-controlled normally inactive means for engaging the rack with the keyboard in a position relative to the numeral indicated by the dial wheel, comprising a lever co-acting with the cam, a totaling bar linked to the lever, a pawl secured to the keyboard and operated by the totaling bar, serrations on the rack bar for engagement by the pawl, and a lock bar for automatically maintaining the totaling bar and engaging pawls in position during the reciprocation of the keyboard.

36. In a calculating machine, the combination of a movable keyboard and a plurality of depressible keys, an independently actuated releasing key and releasing lever, a reversing key and a printing key, a series of dial wheels and actuating step bars, latches, racks, totaling bars and type bars, cams and disks, the parts arranged and operated so that the releasing key, by actuating the releasing lever, prevents the release of the depressed keys and permits of multiplication at the forward movement of the keyboard, the reversing key, by reversing the rotation of the die wheels, permits of subtraction at the backward movement of the keyboard, and the printing key, by simultaneously actuating the releasing lever and reversing key permits of the printing of the total and the return of the dial wheels to zero.

37. In a calculating machine, the combination of a reciprocating keyboard and depressible keys, rotative dial wheels racks intermediate the keys and dial wheels, a reversing key, a slide connected therewith, a lever carrying said slide and oscillated by the keyboard, which slide in its normal position above the fulcrum point of the oscillating lever permits of the rotation of the dial wheels by the racks at the forward movement of the keyboard and when shifted below the fulcrum point reverses the rotation of the dial wheels whereby an addition and subtraction with the same is obtained.

38. In a calculating machine having a reciprocating keyboard, depressible keys and dial wheels actuated thereby, the releasing key 177, the lever 172 and the releasing lever 170 so arranged that the releasing key 177 by moving the lever 172 out of the path of the releasing lever 170 for the depressible keys prevents actuation of the same, whereby a key not being released at the completion of the forward movement of the keyboard permits of the further rotation of the dial wheels by the unreleased key at each forward movement of the keyboard and thus of a multiplication of a given value by the dial wheels.

39. In a calculating machine, having a reciprocating keyboard, depressible keys and dial wheels actuated thereby, the printing key 87, the levers 82, 85, 97, the cams 80 connected with the dial wheels, the totaling bars 99, the step bars 8 with racks 104, the latches connected therewith so arranged that the printing key by actuating levers 82, 85 and 97 and by bringing certain of the levers 97 in engagement with the cams 80 shifts the totaling bars 99 forward for a distance equal to the forward movement of the dial wheels, and at the forward movement of the keyboard by means of the latches couples the step-bars with the racks of the keyboard, whereby at the backward movement of the keyboard all the dial wheels are turned back to zero.

40. In a calculating machine, having a reciprocating keyboard, depressible keys and rotative dial wheels, the releasing key 179, the latch 180, the projection 182 of the stationary framework, the reversing key 41, the projection 202, flange 203 and the bar 23 on the keyboard, the parts so arranged that the releasing key 179 by engagement of the latch 180 thereof with the projection 182 and the reversing key 41 by the engagement of its projection 202 below the flange 203 of the bar 23 of the keyboard are held in their actuated position until the keyboard has completed its movement, whereby a reactuation of the same during such movement is prevented.

41. In a calculating machine, having a reciprocating keyboard, depressible keys, dial wheels actuated thereby, the shaft 108, the type-bars 107, the disk 148, having the segment 150 and the depression 152, the parts so arranged that the disks are coupled with each other and with the type-bars in such a manner that at the forward movement of the type-bars and by the partial rotation of the disk at the type-bar by disks at the right side of the type bar are depressed by their segments into the printing position, whereby at the actuation of the shaft 108 the depressed type-bars will print zeros after the numeral which is printed by the actuated type bar.

42. In a calculating machine, having a reciprocating keyboard, depressible keys and dial wheels actuated thereby, type-bars 107, shaft 108, disks 148 and disk 148$^a$, the parts being so arranged that between certain of the type bars on shaft 108 is located the disks 148$^a$ having a segment at each side thereof which, by the forward movement of the type-bar, connected with the same, actuates the type bar at its left side, whereby according to the decimal system a zero is printed before the numeral printed by the actuated key.

43. In a calculating machine, having a reciprocating keyboard, depressible keys and dial wheels actuated thereby, the printing shaft 108, the disks 148, disks 153 and the disks 148$^a$ and the rod 155, the parts so arranged that at one end of the printing shaft is arranged a disk 153 connected with the other disks by the decimal disks 148$^a$, one of the segment disks engages a depression 154 thereof which disk, by being partially rotated during the backward movement of the keyboard by rod 55 connected with the same, returns all the disks 148, 148$^a$ to normal position which by being actuated, lifts the type-bars.

44. In a calculating machine, having a reciprocating keyboard, depressible keys and rotative dial wheels actuated thereby, the racks 135, the step bars 8 and the lever 130 having a latch 134, the parts so arranged that the forward movement of the keyboard at the actuation of a step-bar by a depressed key is brought into engagement with the rack 135, whereby the actuation of the step-bar 8 by the keyboard is insured.

OTHO EDMUND CLOUD.
AUGUST W. ALBERS.

Witnesses:
MAE HOFMANN,
HOWARD S. OKIE.